(12) United States Patent
Mousseau et al.

(10) Patent No.: US 7,930,704 B2
(45) Date of Patent: Apr. 19, 2011

(54) J2EE COMPONENT EXTENSION ARCHITECTURE

(75) Inventors: Richard Mousseau, Stratham, NH (US); Prasenjit Mukherjee, Karnataka (IN); Deborah C. June, Groton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1044 days.

(21) Appl. No.: 10/357,810

(22) Filed: Feb. 4, 2003

(65) Prior Publication Data

US 2003/0225944 A1 Dec. 4, 2003

Related U.S. Application Data

(60) Provisional application No. 60/354,738, filed on Feb. 6, 2002, provisional application No. 60/397,916, filed on Jul. 23, 2002, provisional application No. 60/406,745, filed on Aug. 29, 2002.

(51) Int. Cl.
*G06F 9/46* (2006.01)
*G06F 15/16* (2006.01)

(52) U.S. Cl. ........................ 719/328; 709/203; 718/101

(58) Field of Classification Search .................. 719/328, 719/331, 332, 315, 316, 311, 313; 709/225, 709/203; 718/101
See application file for complete search history.

(56) References Cited

U.S. PATENT DOCUMENTS

| | | | |
|---|---|---|---|
| 4,714,996 A | 12/1987 | Gladney | |
| 5,163,148 A | 11/1992 | Walls | |
| 5,212,793 A | 5/1993 | Donica et al. | 395/700 |
| 5,249,290 A | 9/1993 | Heizer | 395/650 |
| 5,586,260 A | 12/1996 | Hu | |
| 5,613,060 A | 3/1997 | Britton | 714/15 |
| 5,751,967 A * | 5/1998 | Raab et al. | 709/228 |
| 5,761,507 A | 6/1998 | Govett | 395/684 |
| 5,765,171 A | 6/1998 | Gehani | 707/203 |
| 5,768,504 A | 6/1998 | Kells et al. | 395/187.01 |
| 5,774,689 A | 6/1998 | Curtis et al. | |
| 5,802,291 A | 9/1998 | Balick et al. | 395/200.32 |
| 5,805,798 A | 9/1998 | Kearns | |
| 5,819,107 A | 10/1998 | Lichtman et al. | |
| 5,909,689 A | 6/1999 | Van Ryzin | 707/203 |
| 5,910,180 A | 6/1999 | Flory et al. | |
| 5,926,775 A | 7/1999 | Brumley et al. | |
| 6,018,805 A | 1/2000 | Ma | 714/4 |
| 6,055,243 A | 4/2000 | Vincent et al. | |

(Continued)

OTHER PUBLICATIONS

Kooijmans, Enterprise JavaBeans for z/OS and OS/390 WebSphere Application Server V4.0:, 2001, p. 31-78, 185-240.*

(Continued)

*Primary Examiner* — Diem K Cao
*Assistant Examiner* — Phuong N Hoang
(74) *Attorney, Agent, or Firm* — Fliesler Meyer LLP

(57) ABSTRACT

The J2EE connector architecture can be extended to reduce coding redundancy and resource consumption. A base J2EE connector can be used to allow an application to communicate with a first system or location. An extended connector can be used to communicate with a second system or location. The extended connector can use communication information located in the base connector, such that the extended connector only needs to store configuration information to allow the application to communicate with the second system or location.

This description is not intended to be a complete description of, or limit the scope of, the invention. Other features, aspects, and objects of the invention can be obtained from a review of the specification, the figures, and the claims.

23 Claims, 3 Drawing Sheets

U.S. PATENT DOCUMENTS

| | | | |
|---|---|---|---|
| 6,122,629 A | 9/2000 | Walker | 707/8 |
| 6,134,673 A | 10/2000 | Chrabaszcz | 714/13 |
| 6,173,327 B1 | 1/2001 | De Borst et al. | |
| 6,189,046 B1 | 2/2001 | Moore et al. | |
| 6,212,521 B1 | 4/2001 | Minami | |
| 6,212,556 B1 | 4/2001 | Arunachalam | |
| 6,243,753 B1 | 6/2001 | Machin et al. | |
| 6,269,373 B1 | 7/2001 | Apte et al. | |
| 6,304,879 B1 | 10/2001 | Sobeski | |
| 6,338,089 B1 | 1/2002 | Quinlan | 709/227 |
| 6,343,287 B1 | 1/2002 | Kumar et al. | 707/4 |
| 6,389,462 B1 | 5/2002 | Cohen | 709/218 |
| 6,411,956 B1 | 6/2002 | Ng | 707/10 |
| 6,425,005 B1 | 7/2002 | Dugan | 709/223 |
| 6,430,564 B1 | 8/2002 | Judge | |
| 6,438,705 B1 | 8/2002 | Chao | 714/4 |
| 6,453,321 B1 | 9/2002 | Hill | |
| 6,453,356 B1 | 9/2002 | Sheard et al. | |
| 6,466,972 B1 | 10/2002 | Paul et al. | |
| 6,505,200 B1 | 1/2003 | Ims et al. | |
| 6,505,241 B2 | 1/2003 | Pitts | 709/218 |
| 6,523,130 B1 | 2/2003 | Hickman | 714/4 |
| 6,539,381 B1 | 3/2003 | Prasad et al. | |
| 6,542,845 B1 | 4/2003 | Grucci et al. | 702/122 |
| 6,651,140 B1 | 11/2003 | Kumar | |
| 6,687,848 B1 | 2/2004 | Najmi | 714/4 |
| 6,721,777 B1 | 4/2004 | Sharma | |
| 6,757,708 B1 | 6/2004 | Craig et al. | |
| 6,766,324 B2 | 7/2004 | Carlson | |
| 6,775,703 B1 | 8/2004 | Burns | 709/228 |
| 6,779,017 B1 | 8/2004 | Lamberton | |
| 6,826,601 B2 | 11/2004 | Jacobs | 709/217 |
| 6,832,238 B1 | 12/2004 | Sharma | |
| 6,836,889 B1 | 12/2004 | Chan | |
| 6,854,120 B1* | 2/2005 | Lo et al. | 719/311 |
| 6,898,587 B2 | 5/2005 | Messinger | |
| 6,944,785 B2 | 9/2005 | Gadir | 714/4 |
| 6,963,857 B1 | 11/2005 | Johnson | |
| 7,089,584 B1* | 8/2006 | Sharma | 726/4 |
| 7,100,195 B1 | 8/2006 | Underwood | |
| 7,171,692 B1 | 1/2007 | DeMello | |
| 7,203,756 B2 | 4/2007 | Tapperson | |
| 7,240,101 B2 | 7/2007 | Rich | |
| 7,454,492 B2 | 11/2008 | Bauer et al. | |
| 7,484,224 B2 | 1/2009 | Potter et al. | |
| 7,506,342 B2 | 3/2009 | Mousseau et al. | |
| 7,546,606 B2 | 6/2009 | Upton | |
| 2001/0042073 A1 | 11/2001 | Saether et al. | |
| 2001/0054062 A1 | 12/2001 | Ismael et al. | |
| 2002/0073188 A1 | 6/2002 | Rawson | |
| 2002/0107934 A1 | 8/2002 | Lowery | |
| 2002/0147961 A1 | 10/2002 | Charters | |
| 2002/0161839 A1 | 10/2002 | Colasurdo | |
| 2002/0161860 A1 | 10/2002 | Godlin et al. | |
| 2002/0184444 A1 | 12/2002 | Shandony | |
| 2002/0188591 A1 | 12/2002 | Santosuosso | |
| 2003/0018732 A1 | 1/2003 | Jacobs | |
| 2003/0037181 A1* | 2/2003 | Freed | 709/328 |
| 2003/0041135 A1 | 2/2003 | Keyes et al. | |
| 2003/0060214 A1 | 3/2003 | Hendrey et al. | |
| 2003/0065826 A1 | 4/2003 | Skufca | |
| 2003/0088713 A1 | 5/2003 | Mandal et al. | |
| 2003/0105837 A1 | 6/2003 | Kamen | |
| 2003/0110467 A1 | 6/2003 | Balakrishnan | |
| 2003/0233433 A1 | 12/2003 | Halpern | |
| 2003/0236923 A1 | 12/2003 | Jeyaraman | |
| 2004/0059735 A1 | 3/2004 | Gold et al. | |
| 2004/0153558 A1 | 8/2004 | Gunduc et al. | |
| 2004/0230747 A1 | 11/2004 | Ims et al. | |
| 2006/0080435 A1 | 4/2006 | Tankov et al. | |
| 2006/0168118 A1 | 7/2006 | Godlin et al. | |
| 2006/0212453 A1 | 9/2006 | Eshel et al. | |
| 2008/0270600 A1 | 10/2008 | Tankov et al. | |

OTHER PUBLICATIONS

Bainbridge, "CICS and Enterprise JavaBeans", 2001, v. 40, No. 1, p. 1-19.*
Youngs et. al., "Enterprise Integration with IBM Connectors and Adapters", Feb. 2002, pp. 1-240.*
Stearns, B., "Using the J2EE Connector Architecture Common Client Interface," Sun Systems, Apr. 2001, pp. 1-10.
Marinescu, F., "BEA Weblogic Server 6.1 has been released," TheServerSide.com, p. 1.
Flowers, B., "The J2EE Connector Architecture," Sys-Con Media, May 1, 2001, pp. 1-4.
Rana, A., et al., "Java Junction," Intelligent Enterprise, Apr. 16, 2001, pp. 1-9.
Stanhope, J., "J2EE Connector Architecture Promises to Simplify Connection to Back-End Systems," Giga Information Group, Nov. 16, 2000, pp. 1-4.
Sarathy, V., et al., "Integrating Java Applications with the Enterprise," EAI Journal, May 2001, pp. 50-55.
Rodoni, J., "The J2EE Connector Architecture's Resource Adapter," Sun Systems, Dec. 2001, pp. 1-12.
BEA Systems, WebLogic Server 6.1, Sep. 15, 2001.
Visveswaran, S., "Dive into connection pooling with J2EE," Sun Microsystems, Oct. 2000, pp. 1-7.
Gamma, E., al., "Design Patterns Elements of Reusable Object-Oriented Software," Addison-Wesley Publishing Company, 1998, pp. 293-303.
Sun Microsystems, Enterprise JavaBeans™ Specification, Version 2.0, Aug. 14, 2001.
BEA Systems, BEA WebLogic Server—Programming WebLogic J2EE Connectors, Release 7.0, Aug. 20, 2002, pp. 1-119.
BEA Systems, BEA Weblogic Server 6.1, Jun. 24, 2002, pp. 1-113.
BEA Systems, Inc., "Connection Management," 2001, pp. 1-3, http://e-docs.bea.com/wls/docs61/iconnector/connect.html.

* cited by examiner

J2EE COMPONENT EXTENSION ARCHITECTURE

CLAIM OF PRIORITY

This application claims priority to U.S. Provisional Patent Application No. 60/354,738, filed Feb. 6, 2002, entitled "J2EE COMPONENT EXTENSION ARCHITECTURE," as well as Application No. 60/397,916, filed Jul. 23, 2002, entitled "SYSTEM AND METHOD FOR IMPLEMENTING J2EE CONNECTOR ARCHITECTURE," and Application No. 60/406,745, filed Aug. 29, 2002 entitled "IMPROVED J2EE CONNECTOR ARCHITECTURE," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The invention relates generally to integration of computer systems, and particularly to the integration of servers, applications, and resources within those systems.

BACKGROUND

The Java™ 2 Platform, Enterprise Edition (J2EE), from Sun Microsystems, Inc. of Palo Alto, Calif., defines a standard for developing multi-tier enterprise applications. A J2EE connector architecture is useful for the integration of J2EE-compliant application servers with at least one enterprise information system (EIS). There are typically two parts to this architecture: an EIS vendor-provided resource adapter and an application server to which the resource adapter plugs-in, such as a WebLogic Server available from BEA Systems in San Jose, Calif. This architecture defines a set of contracts that a resource adapter has to support to plug-in to an application server. These contracts can include such functions as transactions, security, and connection management. The J2EE connector architecture also defines a common client interface (CCI) that can be used to access an EIS. A CCI defines a client API for interacting with heterogeneous EIS systems, which enables application components and Enterprise Application Integration (EAI) frameworks to drive interactions across heterogeneous EIS systems using a common client API.

Containers

J2EE organizes business logic into reusable components. A J2EE server can provide underlying services for these components in the form of a container for every component type. Containers are the interface between the components and the platform-specific functionality that supports these components. Before a component can be executed, it is assembled into a J2EE application and deployed into the appropriate container.

Resource Adapters

A resource adapter is a system-level software driver used by an application server to connect to an EIS. A resource adapter, which can contain a library specific to an EIS, can serve as a J2EE connector. A J2EE connector architecture can support resource adapters that are developed by EIS developers, vendors, and/or third-party application developers. These resource adapters can be deployed in any application server supporting the appropriate J2EE specification. Resource adapters contain the Java, and if necessary, the native components required to interact with the EIS.

A J2EE connector architecture can provide packaging and deployment interfaces, so that various resources adapters can easily plug into compliant J2EE application servers in a modular manner. A J2EE connector architecture can be implemented in an application server and an EIS-specific resource adapter.

Architecture Components

A J2EE connector architecture typically has three main components:

(1) system-level contracts between the resource adapter and the application server, (2) a CCI that provides a client API for Java applications and development tools to access the resource adapter, and (3) packaging and deployment interfaces that provide the ability for various resource adapters to plug into J2EE applications in a modular manner.

System Support

The J2EE connector architecture can provide a Java-based solution to the problem of connectivity between a multitude of application servers and EIS systems. By using the connector architecture, an EIS vendor does not need to customize a product for each application server. By conforming to the J2EE connector architecture, custom code is not required in order to extend support connectivity to a new EIS. The connector architecture enables an EIS vendor to provide a standard resource adapter for its EIS. This resource adapter plugs into an application, such as WebLogic Server, and provides the underlying infrastructure for the integration between an EIS and the application.

A resource adapter provider can develop a set of Java interfaces and classes as part of the adapter implementation. These Java classes implement J2EE Connector Architecture-specified contracts and EIS-specific functionality provided by the resource adapter. The Java interfaces and classes are then packaged together with a deployment descriptor to create a resource adapter module. This module can include any required native libraries, help files, documentation, and other resources. A deployment descriptor defines the contract between a resource adapter provider and a deployer for the deployment of a resource adapter.

J2EE connectors can be used to access legacy systems in accordance with J2EE guidelines. A J2EE connector can be used to access the legacy system in order to implement business logic. This business logic can be implemented either by using J2EE server-side components, such as may include an Enterprise JavaBean (EJB) or Java servlet, or by using J2EE client-side components, such as JavaRMI clients. Some examples of legacy systems include Oracle DB2 databases from Oracle Corporation of Redwood Shores, Calif.; IBM mainframe systems from International Business Machines Corporation of Armonk, N.Y.; Enterprise Resource Planning (ERP) systems such as SAP from SAP of Walldorf, Germany and PeopleSoft from PeopleSoft of Pleasanton, Calif.; and Customer Relation Management (CRM) solutions such as Siebel from Siebel Systems, Inc. of San Mateo, Calif. and Oracle's CRM solution from Oracle Corporation of Redwood Shores, Calif.

J2EE Components

A J2EE component itself is typically one of three types: (1) a code file, such as a Java class file; (2) a configuration file, such as an XML configuration file; or (3) a resource file, such as an image file, video file, or audio file that can be used by any appropriate Java classes.

Supporting Additional Systems

If it becomes necessary for an application to access a second legacy system, or another portion of the legacy system, it is necessary to create a second J2EE connector component using existing methods. This leads to not only the need for redundant coding, but also leads to the need to add any updates to both components as well as the need to allocate twice as much memory to store both components.

BRIEF SUMMARY

Systems and methods in accordance with embodiments of the present invention overcome these and other deficiencies by providing an application with access to multiple locations or systems without having to create additional J2EE connector components.

Systems and methods in accordance with one such embodiment extend connector components by building on a base connector component. A base connector, such as a J2EE connector, allows an application to communicate with a first system. An extended connector can be used to allow the application to communicate with a second system. The extended connector can contain configuration information for the second system, but is otherwise adapted to use information in the base connector to communicate with the second system.

The use of information in the base connector eliminates the duplication of information between connectors. The use of base connector information also allows the base connector and extended connector to share files such as class files and resource files. A container, such as a J2EE container, can be used to provide underlying services for the base connector and extended connector. The container can also allow for the monitoring and management of the base connector and extended connector.

Other features, aspects, and objects of the invention can be obtained from a review of the specification, the figures, and the claims.

DETAILED DESCRIPTION

One solution to the problem of reusing and modifying an existing J2EE component applies the concept of inheritance, as is used in object-oriented design methodology. Systems and methods in accordance with one embodiment of the present invention can utilize such a solution by allowing a J2EE component to inherit an existing J2EE component, or base component. This can be done in one embodiment by specifying a custom-defined tag in the appropriate deployment descriptor. Such a system can allow for the modifying and extending of any inherited attributes of the base connector. Such a system can also reduce the footprint of J2EE components, can reduce the deployment time as there is less information to be parsed, and can reduce maintenance overhead as bug-fixes and changes need be done only in a base component. The system can make efficient use of disk resources by eliminating the duplication of bulk resource files otherwise required with multiple base components. Further, if code files are being shared between components, a common class loader can be shared which can lead to faster access of runtime resources.

Figure 1:
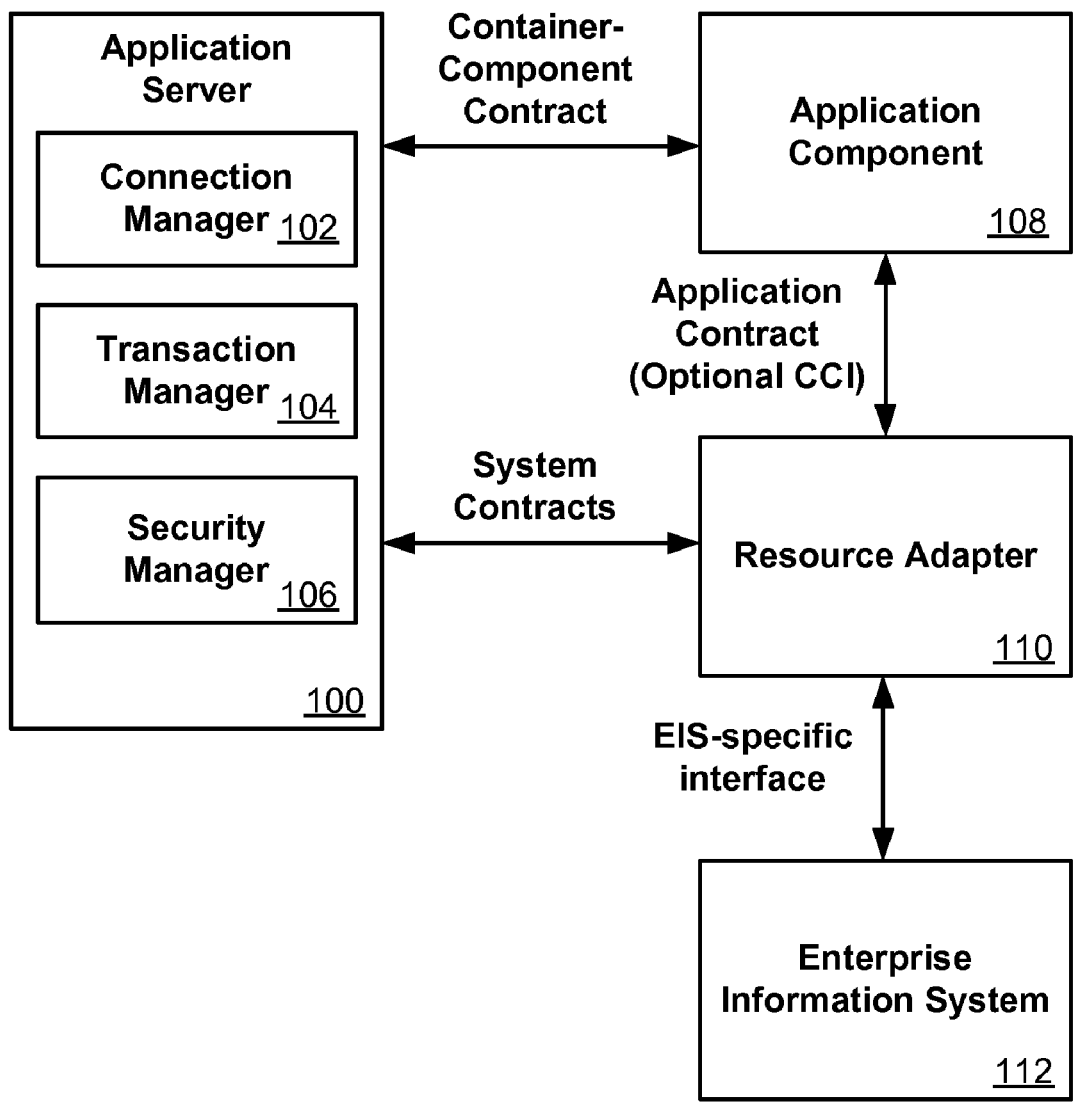
FIG. 1 is a diagram of a system in accordance with one embodiment of the present invention.

FIG. 1 shows a J2EE connector architecture for a J2EE component that can be utilized in accordance with one embodiment of the present invention. An application server 100 is shown, comprising management components for system-level contracts, which in this example include a connection manager 102 for connection contracts, a transaction manager 104 for transaction contracts, and a security manager 106 for security contracts. A connection contract can give an application server pool connections to any underlying EIS 112. It can also allow application components to connect to the EIS 112. The result is a scalable application environment that can support a large number of clients requiring access to EIS.

A transaction contract can exist between a transaction manager 104 and an EIS 112 supporting transaction access to EIS resource managers. This contract can allow an application server 100 to use a transaction manager 104 to manage transactions across multiple resource managers. A security contract can provide secure access to an EIS 112 and can protect information resources that are managed by the EIS.

A resource adapter 110 can be used that is specific to the EIS 112. The resource adapter 110 can be a system library that is specific to the EIS and that can provide connectivity to the EIS 112. An interface between the resource adapter 110 and the EIS 112 can also be specific to the EIS, and can be a native interface.

The architecture utilizes system contracts between the resource adapter 110 and the application server 100. An application contract or common client interface (CCI) can provide a client API for a Java application, application component 108, or development tools to access the resource adapter 110. An EIS-specific interface, which can comprise a packaging and deployment interface, can provide the ability for a resource adapter 110 to connect an EIS 112 and a J2EE application in a modular manner. A container-component contract can also exist between the application server 100, hosting the relevant container, and the application component 108.

Figure 2:
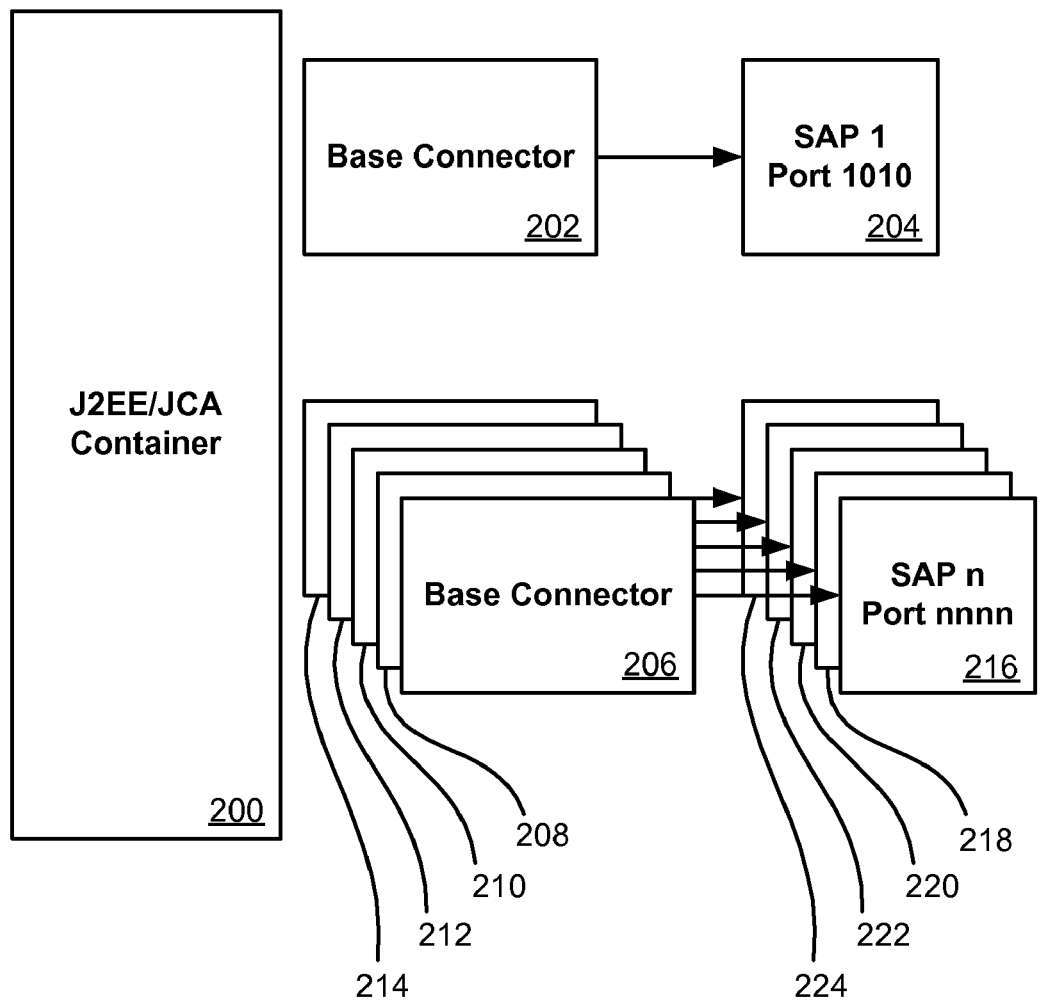
FIG. 2 is a diagram of an architecture that can be used with the system of FIG. 1, which does not utilize connector extension.

FIG. 2 shows an example of a system using J2EE connectors without utilizing component extension. In this example, an enterprise has an ERP solution installed, here an SAP ERP solution, for six different departments using six different ports 204, 216, 218, 220, 222, 224. An application may need to access all six SAP systems. Without using J2EE component extension, a user has to create six mostly similar J2EE connector components, or base components 202, 206, 208, 210, 212, 214. A J2EE/JCA container 200 is shown, which is part of an application server that can provide deployment and run-time support for application components. The user has to separately apply bug-fixes for each of these connector components 202, 206, 208, 210, 212, 214.

Figure 3:
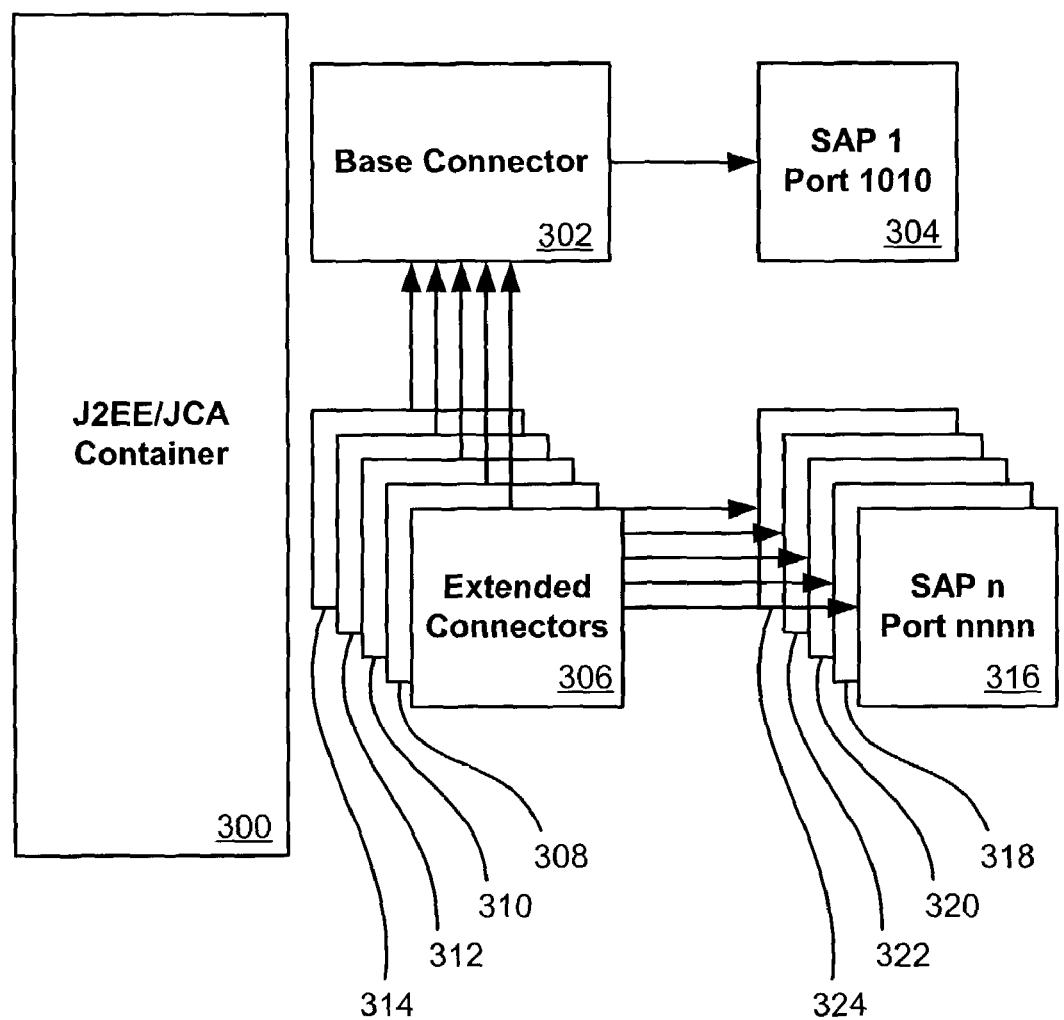
FIG. 3 is a diagram of an architecture that can be used with the system of FIG. 1, which does utilize connector extension.

FIG. 3 shows a system for the same example, but applying component extension in accordance with one embodiment of the present invention. With component extension, the bug fixes only need to be addressed for a single base component 302. Each of these extended connectors 306, 308, 310, 312, 314 can include only configuration changes, such as the machine or port 304, 316, 318, 320, 322, 324 on which the extended connector is running. Each extended connector takes advantage of the information contained in the base connector, such that the information does not need to be duplicated. The extended connectors can modify or extend any attributes of the base connector if necessary. The extended connectors can also share the same class files and resource files with the base connector 302.

A J2EE/JCA container 300 can allow the monitoring and management of supported components, as well as the service(s) that monitor and manage the components. Containers useful with embodiments of the present invention can include connector containers that host resource adapters; web containers that host JSP, servlets, and static HTML pages; EJB containers that host EJB components; and application client containers that host standalone application clients.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer memory containing instructions, when read and executed by a computer, cause the computer to perform steps comprising:

using a base connector that allows an application server to communicate with a first port of an enterprise information system, wherein the base connector use a transaction contract to support a transaction access to the enterprise information system, wherein the transaction contract allows the application server to use a transaction manager to manage one or more transactions across multiple resource managers in the enterprise information system;

using a plurality of extended connectors that allow the application server to communicate with a plurality of ports of the enterprise information system in addition to the first port of the enterprise information system, wherein each extended connector of the plurality of extended connectors contains different configuration information for a particular port of the plurality of ports of the enterprise information system and uses information in the base connector to communicate with the particular port of the enterprise information system, wherein said each extended connector inherits attributes from the base connector as specified in a deployment descriptor and shares the transaction contract with the base connector to support a different transaction access to the enterprise information system through the particular port of the enterprise information system; and providing a connector container for providing underlying services for said base connector and said plurality of extended connectors; and managing said base connector and said plurality of extended connectors using the connector container.

2. A computer memory according to claim 1, wherein:
said connector container allows monitoring of said base connector and said plurality of extended connectors.

3. A computer memory according to claim 1, wherein:
class files and resource files that can be used by said base connector to communicate with said first port of the enterprise information system.

4. A computer memory according to claim 3, wherein:
said class files and resource files can further be used by one of said plurality of extended connectors to communicate with said plurality of ports of the enterprise information system.

5. The computer-readable storage medium of claim 4, wherein a common class loader is shared for the plurality of class and resource files.

6. A computer memory according to claim 1, wherein said extended connector further comprises information for modifying attributes of said base connector.

7. The computer-readable storage medium of claim 1, wherein each of the plurality of extended connectors includes configuration changes to a machine or port on which the extended connector is running.

8. The computer-readable storage medium of claim 1, wherein each of the plurality of extended connectors modifies or extends attributes of the base connector.

9. A computer memory according to claim 1, further containing instructions, when read and executed by a computer, cause the computer to perform a step of allowing one or more application components in the application server to connect with the enterprise information system using the base connector and at least one of the plurality of extended connectors, wherein one or more application components form a scalable application environment that can support a large number of clients requiring access to the enterprise information system.

10. A computer-based method for extending connector architecture components, comprising:

using a base connector that allows an application server to communicate with a first port of an enterprise information system, wherein the base connector use a transaction contract to support a transaction access to the enterprise information system, wherein the transaction contract allows the application server to use a transaction manager to manage one or more transactions across multiple resource managers in the enterprise information system;

using a plurality of extended connectors that allow the application server to communicate with a plurality of ports of the enterprise information system in addition to the first port of the enterprise information system, wherein each extended connector of the plurality of extended connectors contains different configuration information for a particular port of the plurality of ports of the enterprise information system and uses information in the base connector to communicate with the particular port of the enterprise information system, wherein said each extended connector inherits attributes from the base connector as specified in a deployment descriptor and shares the transaction contract with the base connector to support a different transaction access to the enterprise information system through the particular port of the enterprise information system; and providing a connector container for providing underlying services for said base connector and said plurality of extended connectors; and managing said base connector and said plurality of extended connectors using the connector container.

11. A computer-based method according to claim 10, further comprising:

creating class files and resource files that can be used by the base connector to communicate with said enterprise information system.

12. A computer-based method according to claim 11, further comprising:

sharing said class files and resource files that can be used by the base connector with the plurality of extended connectors.

13. The computer-based method of claim 12, wherein a common class loader is shared for the plurality of class and resource files.

14. A computer-based method according to claim 10, further comprising:
creating additional extended connectors that contain configuration information for additional enterprise information systems and utilize information in said base connector, the additional extended connectors allowing the application server to communicate with the additional enterprise information systems.

15. The computer-based method of claim 10, wherein each of the plurality of extended connectors includes configuration changes to a machine or port on which the extended connector is running.

16. The computer-based method of claim 10, wherein each of the plurality of extended connectors modifies or extends attributes of the base connector.

17. A computer-implemented system for extending connector components, comprising:
one or more processors;
a base connector that allows an application to communicate with a first port of an enterprise information system, wherein the base connector use a transaction contract to support a transaction access to the enterprise information system, wherein the transaction contract allows the application server to use a transaction manager to manage one or more transactions across multiple resource managers in the enterprise information system;
a plurality of extended connectors that allow the application to communicate with a plurality of ports of a plurality of enterprise information systems, each extended connector containing different configuration information for a particular port for a system from the plurality of enterprise information systems and adapted to use information in the base connector to communicate with the particular port, wherein said each of the plurality of extended connectors shares the transaction contract with the base connector to support a transaction access to the enterprise information system through the particular port of the enterprise information system and includes only configuration changes;
a connector container for providing underlying services for the base connector and the extended connector, wherein the connector container allows managing and monitoring of the base connector and the plurality of extended connectors;
a plurality of class and resource files that can be used by the base connector to communicate with the first system and by each connector of the plurality of extended connectors to communicate to each system of the plurality of systems.

18. The computer-implemented system of claim 17, wherein each of the plurality of extended connectors includes configuration changes to a machine or port on which the extended connector is running.

19. The computer-implemented system of claim 18, wherein each of the plurality of extended connectors modifies or extends attributes of the base connector.

20. The computer-implemented system of claim 17, wherein a common class loader is shared for the plurality of class and resource files.

21. The computer-implemented system of claim 17, wherein the plurality of extended connectors share the plurality of class and resource files that are used by the base connector to communicate with the first system.

22. The computer-implemented system of claim 17, wherein the base connector supports communication between an application component and the enterprise information system using a separate contract, and wherein the application component runs on the application server.

23. The computer-implemented system of claim 17, wherein each of the extended connector implements a different enterprise information system specific interface to communicate with a different enterprise information system.

* * * * *

UNITED STATES PATENT AND TRADEMARK OFFICE
CERTIFICATE OF CORRECTION

| | | |
|---|---|---|
| PATENT NO. | : 7,930,704 B2 | Page 1 of 1 |
| APPLICATION NO. | : 10/357810 | |
| DATED | : April 19, 2011 | |
| INVENTOR(S) | : Mousseau et al. | |

It is certified that error appears in the above-identified patent and that said Letters Patent is hereby corrected as shown below:

In column 5, line 11, delete "JS P," and insert -- JSP, --, therefor.

Signed and Sealed this
Eighteenth Day of October, 2011

David J. Kappos
*Director of the United States Patent and Trademark Office*